United States Patent [19]

Oyama et al.

[11] 4,354,525
[45] Oct. 19, 1982

[54] ELECTROMAGNETIC VALVE

[75] Inventors: Tadashi Oyama; Shoji Kawata, both of Okazaki, Japan

[73] Assignee: Aisin Seiki Kabushiki Kaisha, Kariya, Japan

[21] Appl. No.: 173,429

[22] Filed: Jul. 29, 1980

[30] Foreign Application Priority Data

Aug. 29, 1979 [JP] Japan .............................. 54-119552[U]

[51] Int. Cl.³ ........................ F16K 11/04; F16K 31/06
[52] U.S. Cl. .................................. 137/625.5; 251/129
[58] Field of Search ........................ 137/625.5, 625.65; 251/129

[56] References Cited

U.S. PATENT DOCUMENTS

| | | | |
|---|---|---|---|
| 2,708,561 | 5/1955 | Ehlke | 137/625.5 X |
| 2,934,090 | 4/1960 | Kenann et al. | 137/625.5 |
| 3,092,145 | 6/1963 | Brinkel | 137/625.65 |
| 4,074,700 | 2/1978 | Engle | 137/625.65 X |

*Primary Examiner*—Arnold Rosenthal

*Attorney, Agent, or Firm*—Oblon, Fisher, Spivak, McClelland & Maier

[57] ABSTRACT

An electromagnetic valve assembly including a housing, a movable core axially, movably disposed in the housing, an electromagnetic coil positioned adjacent the movable core actuatable to move the movable core from a first position to a second position upon energization of the electromagnetic coil, a shaft coaxial with the movable core and axially movable together with the movable core, a valve mechanism including a valve member axially movably mounted on the shaft, a first and second valve seat disposed in the housing, the valve member being seated on the first valve seat when the movable core is in the first position and being seated on the second valve seat when the movable core is in the second position, a first spring member for continuously biasing the shaft and movable core to the first position, a stopper member secured to the housing engageable with the shaft and movable core upon the movable core being disposed in the first position and a second spring member for continuously biasing the valve member so as to be seated on the first valve seat.

6 Claims, 2 Drawing Figures

ELECTROMAGNETIC VALVE

BACKGROUND OF THE INVENTION

1. Field of the Invention

This invention relates generally to electromagnetic valves, and more particularly, to an electromagnetic valve including a movable core disposed in a housing axially movable from its original position to an axial position upon energization of an electromagnetic coil, an axial shaft arranged coaxially to the core movable together with the core, a valve member mounted on the shaft and in contact with a seat provided in the housing when the core is positioned at its original position and separated from the seat when the core is moved to its axial position, a spring member for biasing the core and the shaft to their original positions and a stopper member defining the original position of the core.

2. Description of the Prior Art

Usually, the valve member of the above type electromagnetic valve is mounted on the shaft for integral movement therewith. This arrangement, however, requires a very strict tolerance upon assembly of the stopper member for a movable core. The reason for this is that, if the stopper is not accurately installed (i.e., assembled to the housing), the valve member is unnecessarily forced to be seated on the seat provided in the housing which will result in a decrease in the durability of the valve member, or if not sufficiently seated on the seat, such will result in fluid leakage therebetween.

SUMMARY OF THE INVENTION

It is therefore an object of the present invention to provide an improved electromagnetic valve which obviates the above-noted conventional drawbacks.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
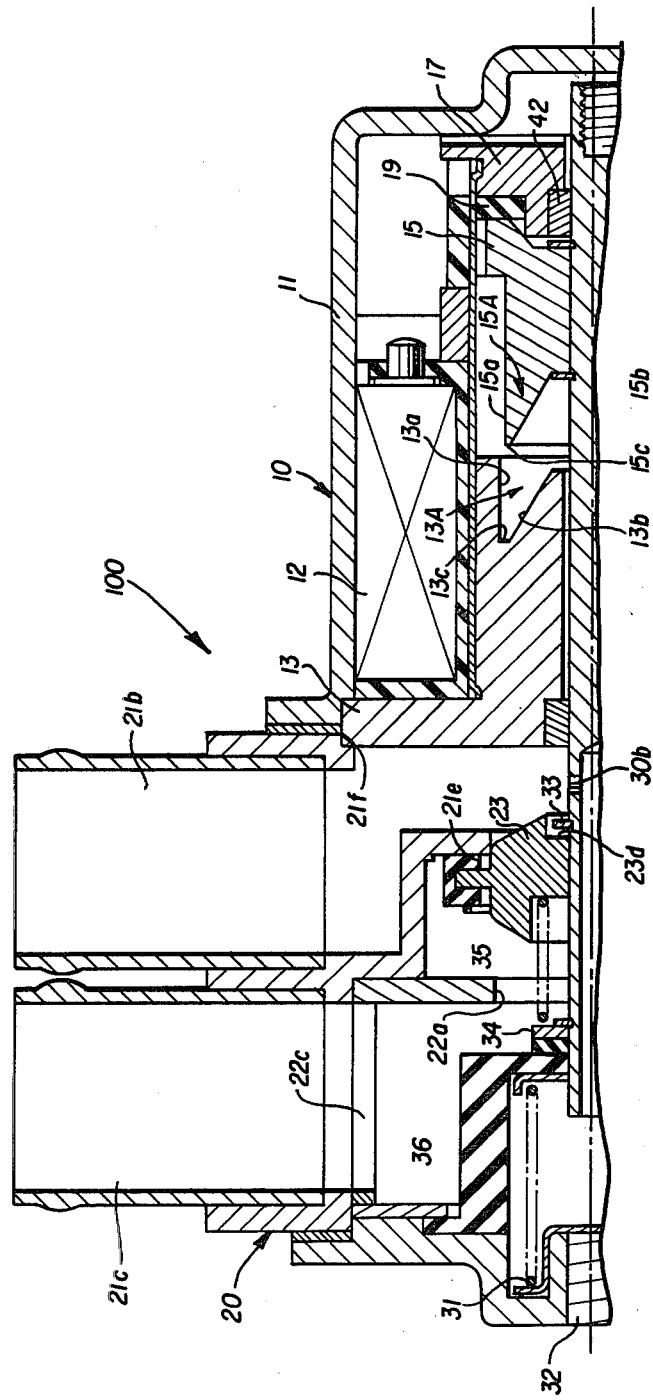
FIG. 1 shows a partial cross sectional view illustrating electromagnetic valve 100 in an open position.

An electromagnetic valve 100 in accordance with the present invention is utilized in a secondary air supply device for an exhaust gas cleaning system of an automobile. The valve 100 includes two parts, one being an electromagnetic motor 10 and the other being a fluid flow control valve 20.

Electromagnetic motor 10 includes a cup-shaped motor housing 11, an electromagnetic coil 12 disposed within the housing 11, a stepped stationary core 13 which includes a stepped cylinder positioned adjacent the coil 12 at its shoulder portion, annular yoke member 14, (FIG. 2) disposed adjacent the coil 12 opposite to the stepped cylindrical of stationary core 13 and a movable core 15 disposed between the yoke 14 and the stationary core 13. Electromagnetic motor 10 further includes a collar member 16 at the right end of the yoke member 14 positioned within the housing 11 and a holder member 17 disposed adjacent collar member 16.

The electromagnetic coil wound on a bobbin 12A is mounted on a sleeve 18 made of non-magnetic, thin material, one end (i.e., left end) of which is secured to the shoulder portion of the stationary core 13 and the other end (i.e, right end) of which is secured to the shoulder portion of the holder member 17. The bobbin 12A includes a first projection 12a which is fixedly inserted into a bore 13d provided in the stationary core 13 for preventing the core from rotating and a second projection 12b which is fixedly inserted into a bore 14a provided in the yoke member 14 for preventing the yoke member 14 from rotating.

Stationary core 13, made of magnetic material, has a cylindrical portion in which a bearing member 41 is coaxially attached under pressure and an axially extending annual recess 13A open in the direction of movement of movable core 15. Annual recess 13A of the stationary core 13 includes a cylindrical outer wall surface 13a, a tapered inner wall surface 13b and a bottom wall surface 13c.

Yoke member 14, made of magnetic material, is mounted on the sleeve 18 coaxial thereto and is prevented from axial movement between the bobbin 12A and the collar member 16. Holder member 17, made of aluminum, includes a cylindrical portion in which a bearing member 42 is coaxially attached under pressure. Holder member 17 further includes an annual rubber seat 19 at its left end which serves as a bumper stopper for the movable core 15. Rubber seat 19 defines and restricts the original position of the movable core 15 as shown in FIG. 1.

Movable core 15, made of magnetic material, is disposed in the sleeve 18 and is axially movable within the sleeve 18 between the annular rubber seat 19 and the annular recess 13A of the stationary core 13. Movable core 15 is mounted on a shaft member 30. Movable core 15 is also provided with a slot 15d which establishes communication between front and rear spaces of the movable core 15 for preventing possible vacuum suction at the rear space.

Movable core 15 is further provided with an annular projection 15A extending toward the annular recess 13A of the stationary core 13. Annular projection 15A includes an outer wall surface 15a the diameter of which is slightly smaller than that of outer wall surface 13a of the recess 13A, a tapered inner wall surface 15b which has the same angle of inclination as that of the tapered inner wall surface 13b of the recess 13A and a top end surface 15c.

Shaft member 30, made of non-magnetic material, is axially movably supported on bearing members 41 and 42. The left end portion of the shaft member 30 extends through the bearing member 41 up to the fluid flow control valve 20. Shaft member 30 is continuously biased toward the right by a compression spring 31 preloaded under a relatively large compressibility valve. The amount of preloading of the spring 31 is adjustable by screw 32.

Since all the parts—electromagnetic coil 12, stationary core 13, yoke member 14, movable core 15, shaft member 30, bearing members 41, 42, collar member 16, sleeve 18 and holder member 17 including rubber seat 19—in the motor housing 11 can be preassembled as explained above, the accuracy of a concentric arrangement between the stationary core 13 and holder member 17 may be easily obtained, and further, assembly of electromotor 10 may be highly facilitated. The assembly unit which includes coil 12, cores 13 and 15, yoke member 14, collar member 16, holder member 17 and sleeve 18 may be easily housed within housing 11 by inserting a lead outlet portion 16a of the collar member 16 into a hole 11a of the motor housing 11 (FIG. 2) and by inserting the large diameter portion of the stationary core 13 into an annular recess 11b provided at the left end of the housing 11.

Next referring to the structure of fluid flow control valve 20, a valve housing 21 is connected to the motor housing 11 through a gasket 50 and screw members. A sleeve 22 is coaxially disposed within the valve housing 21 and is prevented from relative rotational movement with the valve housing 21 by a pin 25 provided therebetween. At the left end of the valve housing 21 is disposed a holder 24 secured to the housing 21 by a gasket 51 and screw members. Valve housing 21, made of aluminum, includes an inlet port 21a which is connected to an air pump (not shown), an outlet port 21b which is connected to an engine exhaust gas pipe (not shown) and a drain port 21c exposed to atmospheric pressure.

A first valve seat 21e is provided in the housing 21 between the inlet and outlet ports 21a and 21b while a second valve seat 22b is mounted on the sleeve 22 between the inlet and drain ports 21a and 21c. A valve member 23 mounted on the shaft 30 is located between valve seats 21e and 22b and is movable between a first, original position shown in FIG. 1 wherein the right end face of the valve member 23 is received in a hole 21d and engages the valve seat 21e for interrupting fluid communication between the inlet and outlet ports 21a and 21b and a second position shown in FIG. 2 wherein the left end face of the valve member 23 is received within a hole 22a of the sleeve 22 and is seated on the valve seat 22b for interrupting fluid communicaton between the inlet and drain ports 21a and 21c. The stationary core 13 in the motor housing 11 is prevented from axial and rotational movements by being received in a recess 21f of the valve housing 21 as well as being positioned in the recess 11b of the motor housing 11.

Figure 2:
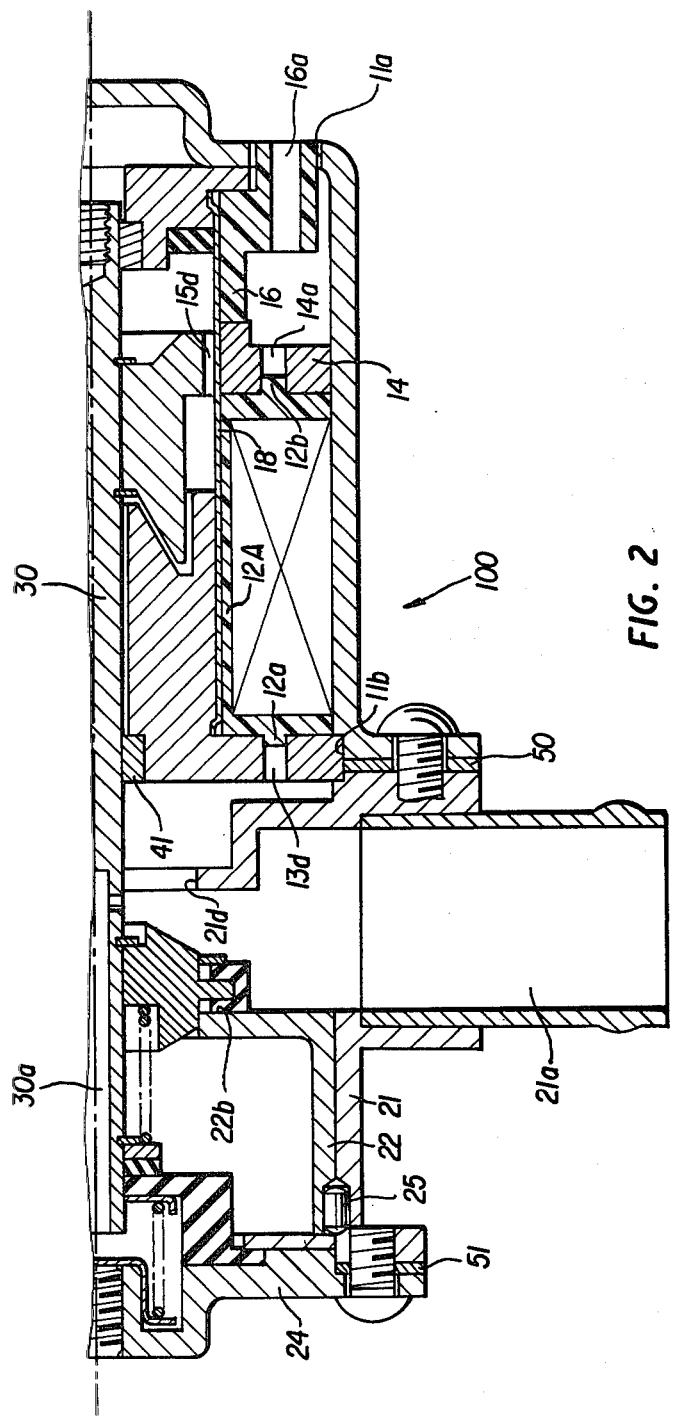
FIG. 2 shows a partial cross sectional view illustrating electromagnetic valve 100 in a closed position.

Valve member 23 is axially movably mounted on the shaft 30 and is continuously biased toward the right by spring 35 provided between the right end of the valve member 23 and a retainer 34 secured to the shaft 30. A clip 33 is provided on the shaft 30 and is engageable with the right end face of the valve member 23 as shown in FIG. 2. A bellows 36 is sealingly positioned between the shaft 30 and holder 24 to enable smooth, axial movement of the shaft 30. The hollow, inner space of the bellows 36 communicates with a space provided at the right side of the valve member 23 in the valve housing 21 through passages 30a and 30b provided in the shaft 30.

Referring now to the operation of the preferred embodiment of the present invention, when the electromagnetic coil 12 is under a deenergized condition, the shaft 30 and the movable core 15 are in their original position shown in FIG. 1 due the force of spring 31. Valve member 23 is seated on valve seat 21e by the force of spring 35 and is also separated from valve seat 22b. Accordingly, pressurized air from the air pump is released to atmosphere through the hole 22a and the port 21c. Since the force of spring 35 may be designed to be sufficient to seat the valve member 23 to the seat 21e, there will be no occurrence of an unnecessarily strong force or insufficient force applied to seat 21e. Further, even when a vehicle is running on a rough road and shaft 30 and movable core 15 of the electromagnetic valve 100 are moved slightly against the force of spring 31, valve member 23 is maintained seated on the seat 21e until it contacts with the clip 33 on the shaft which prevents the valve from erroneous operation.

When the electromagnetic coil 12 is energized such moves toward the left against the biasing force of spring 31 to the position shown in FIG. 2. Annular projection 15A of the movable core 15 is received in the annular recess 13A of the stationary core 13. Due to this leftward movement of the core 15A, the shaft 30 also moves to the left overcoming the spring force of 31. Clip 33 on the shaft 30 is also moved to the left within recess 23a of the valve member 23. After the clip 30 engages with the right end face of the valve member 23, valve member 23 is moved to the left unitarily with the shaft 30 and the movable core 15 to the position shown in FIG. 2. In this position, valve member 23 is separated from the seat 21e allowing communication between the inlet and outlet ports 21a and 21b through hole 21d and at the same time, valve member 23 is seated on the valve seat 22b so as to interrupt communication between the inlet and drain ports 21a and 21c through hole 22a. Thus, the compressed air from the air pump is supplied to the exhaust gas pipe through the outlet port 21b. Although a pressure differential occurs between the front and rear spaces of the valve member 23 upon movement thereof, such pressure differential is compensated for by a pressure difference between the inner and outer spaces of bellows 36 which are connected with each other through passages 30a and 30b.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electromagnetic valve assembly comprising:
    a housing;
    a movable core axially, movably disposed in said housing;
    an electromagnetic coil positioned adjacent said movable core actuatable to move said movable core from a first position to a second position upon energization of said electromagnetic coil;
    a shaft coaxial with said movable core and axially movable together with said movable core;
    valve means including a valve member axially, movably mounted on said shaft, a first and second valve seat disposed in said housing, said valve member being seated on said first valve seat when said movable core is in said first position and being seated on said second valve seat when said movable core is in said second position;
    first spring means for continuously biasing said shaft and movable core to said first position;
    a stopper member secured to said housing engageable with said shaft and movable core upon said movable core being disposed in said first position; and
    second spring means separately positioned from said first spring means and mounted on said shaft for continuously biasing said valve member so as to be seated on said first valve seat.

2. An electromagnetic valve assembly as set forth in claim 1, further comprising:

means mounted on said shaft for engagement of said valve member in a predetermined position between said first position and said second position for limiting axial movement of said valve member along said shaft.

3. An electromagnetic valve assembly as set forth in claim 2, said means for limiting axial movement of said valve member comprising a clip member.

4. An electromagnetic valve assembly as set forth in claim 1, further comprising:
holder means secured to said housing; and
a bellows sealingly disposed between said shaft and said holder means for assisting axial movement of said shaft.

5. An electromagnetic valve assembly as set forth in claims 1 or 2, further comprising inlet and outlet port means wherein said valve means controls communication between said inlet and outlet port means.

6. An electromagnetic valve assembly comprising:
a housing;
a movable core axially, movably disposed in said housing;
an electromagnetic coil positioned adjacent said movable core actuatable to move said movable core from a first position to a second position upon energization of said electromagnetic coil;
a shaft coaxial with said movable core and axially movable together with said movable core;
valve means including a valve member axially, movably mounted on said shaft, a first and second valve seat disposed in said housing, said valve member being seated on said first valve seat when said movable core is in said first position and being seated on said second valve seat when said movable core is in said second position;
first spring means for continuously biasing said shaft and movable core to said first position;
a stopper member secured to said housing engageable with said shaft and movable core upon said movable core being disposed in said first position;
second spring means for continuously biasing said valve member so as to be seated on said first valve seat;
means mounted on said shaft for engagement of said valve member in a predetermined position between first position and said second position for limiting axial movement of said valve member along said shaft;
holder means secured to said housing; and
a bellows sealingly disposed between said shaft and said holder means for assisting axial movement of said shaft.

* * * * *